United States Patent [19]

Beuk et al.

[11] 4,024,285

[45] May 17, 1977

[54] PROCESS FOR PREPARING PLANT PROTEASE SOLUTIONS

[75] Inventors: Jack F. Beuk, Hinsdale; William D. Warner, Elmhurst; Chunghee K. Kang, Hinsdale, all of Ill.

[73] Assignee: Swift and Company Limited, Chicago, Ill.

[22] Filed: Mar. 15, 1976

[21] Appl. No.: 667,083

[52] U.S. Cl. .................................. 426/2; 426/63; 195/68
[51] Int. Cl.$^2$ ........................................ A22C 18/00
[58] Field of Search ............ 426/2, 63; 195/66, 65, 195/68

[56] References Cited

UNITED STATES PATENTS 3,818,106  6/1974  Kang et al. ............................ 426/2

*Primary Examiner*—R. B. Penland
*Attorney, Agent, or Firm*—Edward T. McCabe; Charles E. Bouton; Robert E. Blankenbaker

[57] ABSTRACT

Aqueous solutions of crude or food grade plant proteases are held at a pH of from 11 to 12.5 for a period of time sufficient to reversibly inactivate active proteolytic enzymes without substantially reducing total enzymatic activity.

8 Claims, No Drawings

PROCESS FOR PREPARING PLANT PROTEASE SOLUTIONS

The present invention relates to the preparation of plant protease solutions useful in the tenderization of meat by ante-mortem injection. More specifically, the present invention pertains to a process for preparing proteolytic enzyme formulations containing large amounts of reversibly inactivated enzyme molecules which are stable during storage, and which produce minimal adverse physiological reaction upon injection into live animals.

The technique of ante-mortem enzyme injection as a means of meat tenderization is described in U.S. Pat. No. 2,903,362. Briefly, this technique involves the injection of a proteolytic enzyme solution into the vascular system of a living animal, then holding the animal for a time sufficient to obtain uniform distribution of the enzyme throughout the animal's system, and thereafter slaughtering the animal. Meat cuts derived from animals injected in this manner are very tender and exhibit good textural properties. While this technique is of substantial value in obtaining meat which, when cooked, is uniformly tender, there are undesirable animal side reactions which occur if some commercially available enzymes are utilized. Specifically, injection of the enzyme into a live animal often causes internal hemorrhaging and edema of the internal organs.

It has formerly been thought that the adverse physiological reactions observed in live animals were primarily due to the presence of certain undesirable components (impurities) present in the commercially available enzyme. Much work has been done to remove or render harmless these undesirable components from commercial enzyme preparations. For example, U.S. Pat. No. 3,052,551 describes several methods for the purification and/or stabilization of enzyme solutions. Unfortunately, these purification and/or stabilization procedures usually result in the irreversible inactivation of a substantial portion of the active enzyme. Since only active enzymes can tenderize meat, irreversible inactivation of a substantial portion of the active enzymes renders the enzyme less effective in post-mortem tenderization. Also, U.S. Pat. No. 3,446,706 describes a method of preparing improved enzyme solutions comprising adjusting the pH of an enzyme solution to greater than 7.5, reversibly inactivating the enzymes by a hydrogen peroxide/catalase treatment, and then holding the solution at a pH of above 7.5 for from 2–24 hours. Although this technique produces a proteolytic enzyme formulation which is commercially acceptable for ante-mortem injection, treatment of the enzyme with hydrogen peroxide may cause irreversible inactivation of a portion of the originally active enzymes, thus reducing the tenderizing potential of the enzyme.

In order to overcome problems of irreversible inactivation of enzymes, the process described in U.S. Pat. No. 3,818,106 was developed. This process eliminates the necessity of using hydrogen peroxide, instead achieving reversible inactivation by reaction of the proteolytic enzyme with one or more of a specific group of disulfide inactivators, e.g., thiamine disulfide, at a pH of from 6–12, and preferably from 7–9. Although this technique overcomes the prior art problem of irreversible inactivation, it has one primary drawback. Namely, the specific disulfide inactivators which are effective have not received government regulatory approval for use in meat products.

In view of the foregoing status of the art, there is a continuing need for a method to treat commercially available proteolytic enzymes to reversibly inactivate the enzyme to safe levels without substantially reducing total enzymatic activity.

It is therefore an object of the present invention to provide an improved method of preparing reversibly inactivated enzyme formulations for ante-mortem injection of animals.

It is another object of the present invention to provide an improved method for preparing reversibly inactivated enzyme solutions without substantially reducing total enzymatic activity thereof.

It is also an object of the present invention to provide an improved method for preparing reversibly inactivated enzyme solutions that are stable during storage and which exhibit a very low aerobic bacterial count.

It is also an object of the present invention to provide an improved method of preparing reversibly inactivated proteolytic enzyme formulations which will not cause adverse physiological reactions upon ante-mortem injection into animals.

Additional objects of the present invention, if not specifically set forth herein, will be readily apparent to those skilled in the art from a reading of the following detailed description of the invention.

Commercial food grade and crude enzyme powders contain a mixture of "active" enzyme molecules, "reversibly inactive" enzyme molecules, and "irreversibly inactive" enzyme molecules. The ratios of these types of enzyme molecules vary from one batch of enzyme to another.

"Active" enzyme molecules produce meat tenderization through proteolysis, but also may cause severe physiological reactions when injected into live animals. For example, intravascular injection of live animals with solutions of commercially available crude enzymes, such as papain or ficin, produces such symptoms as labored breathing, nasal congestion, depression, frothing at the mouth, and in severe cases the animal will become cyanotic and die. The autopsy findings of such animals usually include hemorrhaging in the kidneys, heart, liver, intestines, gall bladder and larynx. As a result of these symptoms, such animals are condemned by governmental inspectors.

"Irreversibly inactive" enzyme molecules are those which, due to oxidation, hydrolysis, etc. of the active enzyme molecule, have permanently lost their activity, at least under the processing conditions of ante-mortem enzyme solutions, and therefore produce no tenderization effect or animal reaction.

"Reversibly inactive" enzyme molecules produce no adverse physiological reactions upon intravascular injection into live animals. However, these enzyme molecules are subsequently reactivated within the animal's vascular system by naturally occurring reducing compounds and by heat, thereby resulting in subsequent tenderization of the meat. Therefore, the primary desideratum in preparing enzyme solutions for ante-mortem animal injection is to obtain an enzyme solution containing a maximum amount of reversibly inactive enzyme molecules, and a minimum amount of active and irreversibly inactive enzyme molecules.

An accepted method for developing a quantitative determination as to enzyme activity of active molecules and as to the total enzyme activity, (which includes the sum of active enzyme molecules and reversibly inactive enzyme molecules) is set forth in U.S. Pat. No. 3,446,626. Essentially, the amount of active enzyme molecules in a given solution is determined by employing a milk clot assay of available enzyme activity. The units for measuring active enzyme molecules are generally called non-reduced milk clot units, and are referred to hereafter as the available milk clot activity or available milk clot units (AMCU) Where a measure of the reversibly inactive enzyme molecules is desired, it is necessary to first determine the total enzyme activity, and then subtract the amount of active enzyme (AMCU) therefrom. To determine total enzyme activity, the enzyme solution is treated with an activator or reducing agent such as cysteine, cyanide, bisulfite, or the like, whereby all the reversibly inactivated enzyme is restored to the active state. The milk clot assay using cysteine or other activators measures the sum of active and reversibly inactive enzyme molecules. This measurement is referred to as either reduced milk clot units or total milk clot units (TMCU). Any reduction in this value (TMCU) during processing indicates a loss in the overall enzyme activity of the solution being assayed. However, reduction in the AMCU, without a corresponding reduction in the TMCU value, indicates the amount of active enzyme molecules which have been converted to reversibly inactivated molecules.

The prior art has previously recognized that pure papain tends to exhibit stability at alkaline pH values of from 8.0 up to 12.0, at least for a few minutes, and denatures at pH values above 12.0. See "Phenolic Hydroxyl Ionization in Papain" by Glazer & Smith in the *Journal of Biological Chemistry*, Vol. 236, No. 11, (1961) at pp. 2948-51. See also the article by Lineweaver, et al. in *Enzymoglia*, Vol. 10 (1941) at page 81 wherein it was stated that crystalline papain at 30° C is stable from pH 3 to 12. However, in both crude and food grade commercial papains, there are present several proteolytic enzymes other than pure papain. For example, chymopapain proteases may constitute up to 90% of the total proteases in food grade and crude papain commercial powders. Moreover, with respect to these food grade and crude enzyme powders, it has long been felt that such commercial enzyme powders could not be held over substantial periods of time at high pH values. For example, at column 3, lines 1-7 of U.S. Pat. No. 3,446,706, the patentee stated that practical considerations render it difficult to employ a pH of much above about 10.0-10.5 due to the fact that the enzymes become unstable at such high pH values. Surprisingly, we have been able to process crude and food grade papain and ficin proteases over extended periods of time at pH values of 11.0 to 12.5 with causing enzyme denaturation and without causing any substantial loss in total enzymatic activity.

Generally, the method of this invention comprises holding aqueous solutions of papain, ficin, or mixtures thereof at a pH of from 11.0 to 12.5 over an extended period of time to reversibly inactivate the enzymes. The reversibly inactivated enzyme may then be injected ante-mortem into animal stock without resulting in adverse physiological reactions in the animal. The invention is specifically directed to the treatment of the plant sulfhydryl proteases papain and ficin; and in particular, this invention is directed to the treatment of commercially available crude and food grade papain and ficin enzymes.

Ordinarily, the initial enzyme solution used in the present invention is prepared by first forming a paste of the food grade or crude papain or ficin enzyme by mixing same with an organic water soluble liquid such as glycerine, glycols, or other water soluble or water dispersible wetting agents. The paste thus formed is then dissolved or suspended in water having a temperature of about 10°-15° C. by merely adding the water to the paste with constant stirring. The enzyme paste should be diluted sufficiently to give an enzyme concentration of from about 1-25% by weight, and preferably from about 2-10% by weight.

The pH of the solution is then adjusted to within a range of from 11.0 to 12.5, and preferably to about 12.0, by the addition of a water-soluble base, preferably sodium hydroxide. Upon adjustment of the pH, the aqueous enzyme solution is then held at a low temperature, usually 0°-20° C., and preferably 0°-10° C., for a period of time of greater than 4 hours, and preferably for from about 12-72 hours.

The holding time required is that time sufficient to reversibly inactivate active enzyme content (AMCU) of the solution to a point whereby intravascular antemortem injection into animals does not result in adverse physiological reactions. As a general rule of thumb, reduction of enzyme activity to below 10 AMCU, but most preferably below 2 AMCU, will result in a final enzyme solution which is suitable for antemortem intravascular injection into animal stock. In this regard, it should be understood that enzyme solutions exhibiting AMCU levels of from 20 to 30 or above result in death of the injected animal. Due to wide variations from batch to batch of crude and food grade papain and ficin powders, no definite holding time can be defined for all batches. It has been determined that a holding time of at least 4 hours at pH 11.0 to 12.5 is required in order to reduce available enzyme activity of even low-activity batches to a point below about 10 AMCU. However, it should be understood, that holding times of from 24 hours to greater than 72 hours are often required with various batches of crude and food grade papain and ficin powders in order to sufficiently reduce the available milk clotting activity to safe levels for ante-mortem injection.

Another embodiment of the present invention envisions a two-sep alkaline pH holding process to reduce available milk clotting units to an acceptable level for ante-mortem intravascular injection. In this particular embodiment, the papain and/or ficin enzyme solution is prepared as previously described, and the pH adjusted to a level of from 11.0 to 12.5, also as previously described. The enzyme solution is then held at ph 11.0 to 12.5, and preferably at pH 12.0, for from about 15 minutes ¼ hour) to 24 hours, and preferably for from 4 to 20 hours. The pH of the enzyme solution is next adjusted to from about 7.0 to 10.5, and preferably to a pH of about 8.0, and is then further held at this lower pH for a period of time of greater than 2 hours, and preferably for from about 2 to 48 hours. It should be noted that there is no maximum holding time with respect to the second holding step, and that in fact, the enzyme solution may be held or stored at a pH of from 7.0 to 10.5 for days or months. Both holding steps in this embodiment are carried out at low temperatures, usually from about 0°-20° C., and preferably 0°-10° C.

The two-step holding process is operable to reduce available milk clotting units to below about 10 AMCU, and in most cases to below about 2 AMCU, within less than 48 hours. Again, the total holding time required for each step will be determined by the nature of the particular crude or food grade papain or ficin powder utilized.

It should be noted that the above-described one-step reversible inactivation process may be utilized in conjunction with the invention of U.S. Pat. No. 3,818,106 wherein a method is described for reversibly inactivating proteolytic enzymes by reaction with a disulfide reagent. We have discovered that pretreatment of solutions of crude or food grade papain or ficin at pH 11.0 to 12.5 for from 4 to 72 hours, followed by disulfide inactivation as described in U.S. Pat. No. 3,818,106, results in an enzyme solution with an acceptably low AMCU content for intravascular injection into live animals. Combining the present invention, as a pretreatment, with the disulfide inactivation procedure, will operate to reduce the total amount of processing time required to lower AMCUs to a safe level.

Another important advantage of the present invention, not obtainable by prior art procedures, is that bacterial contamination (aerobic count) is drastically reduced at such high pH values.

Without desiring to be bound by theory, it is believed that the effectiveness of the present invention is due to a unique configuration of the enzyme molecule at very high pH values. It is known that, depending on the particular plant protease, it will denature at a pH in excess of from about 12.0 to 12.5. It is believed that when the enzyme is exposed to a pH of about 12.0, the enzyme chain is in an incipient breaking configuration, and that therefore, the enzyme molecule is more receptive to reversible inactivation.

The papain and/or ficin enzyme solutions prepared in accordance with the present invention may be injected by ante-mortem intravascular techniques previously described in the art. Subsequent to injection into live animals, the enzyme is circulated throughout the vascular system of the animal, and the animal is thereafter slaughtered. Normally, the enzyme is activated during heating of the heat (cooking), such that the enzyme tenderizes the meat during such heating.

The following examples are given as illustrative of the present process and the results derived therefrom. The examples should be considered as illustrative only and not in any way limiting the scope of the present invention.

By definition, as used in the following examples, a milk clot unit (MCU) is that amount of activity in one ml. that will cause 5 ml. of milk substrate to clot in 60 seconds at 40° C. Thus, the formula for calculating the milk clot unit of a properly diluted enzyme solution is as follows where t equals clotting time in seconds: MCU/ml. = 60/t.

EXAMPLE I

75 Grams of enzyme powder were mixed with an equal weight of cold glycerine until a uniform slurry was formed. Cold distilled water was slowly added with constant stirring until a volume of 1000 ml. was reached. The stirring was continued to assure homogeniety after which the enzyme suspension was set aside in a 10° C. cooler for 30 minutes. 200 ml. aliquots were adjusted to pH 8, 10, 11, 12, or 13. The solutions were aged at cooler temperatures (5°–10° C.) for 24 hours and then frozen prior to analysis. The procedure was repeated for each enzyme powder with the following results.

|  | pH | TMCU |
| --- | --- | --- |
| Crude papain Sample No. 1 | 8 | 57 |
|  | 10 | 59 |
|  | 11 | 59 |
|  | 12 | 59 |
|  | 13 | 32 |
| Crude papain Sample No. 2 | 8 | 46 |
|  | 10 | 46 |
|  | 11 | 54 |
|  | 12 | 50 |
|  | 13 | 26 |
| Food grade papain Sample No. 1 | 8 | 59 |
|  | 10 | 60 |
|  | 11 | 57 |
|  | 12 | 53 |
|  | 13 | 36 |
| Food grade papain Sample No. 2 | 8 | 60 |
|  | 10 | 53 |
|  | 11 | 61 |
|  | 12 | 51 |
|  | 13 | 15 |
| Crude ficin Sample No. 1 | 8 | 158 |
|  | 10 | 140 |
|  | 11 | 146 |
|  | 12 | 125 |
|  | 13 | 10 |

This example indicates the stability of commercially available papain and ficin enzyme powders at pH 8.0 to 12.0, and the subsequent lack of stability, as indicated by loss of total activity, upon increasing the pH to 13.0.

EXAMPLE II

A 7.5% solution of food grade papain by weight was prepared as described in Example I and divided into three aliquots. The pH was adjusted to 8, 10, and 12 respectively with NaOH and the beakers set in a water bath at 10° C. for 72 hours. Aliquots were removed at 24, 48, and 72 hours for analyses. At the end of 24 hours all samples were adjusted to pH 8.0 and continued aging at 10° C. for an additional 48 hours. The 24 hour samples were adjusted to pH 8.0 immediately prior to analyses. Total aerobic count was determined after 72 hours incubation.

| Initial pH | 24 hour | | 48 hour | | 72 hour | | Aerobic Count |
| --- | --- | --- | --- | --- | --- | --- | --- |
|  | TMCU | AMCU | TMCU | AMCU | TMCU | AMCU |  |
| 8.0 | 50 | 10.0 | 42 | 6.0 | 38 | 5.0 | 67,000 |
| 10.0 | 47 | 7.0 | 41 | 1.6 | 42 | 1.2 | 30,000 |
| 12.0 | 46 | 5.0 | 43 | 1.5 | 41 | 1.2 | 3,200 |

This example demonstrates the increased effectiveness of high pH, e.g., pH 12.0, in reversibly inactivating food grade papain as compared to use of a lower pH over the same period of time, e.g., 24 hours. This example also demonstrates the greatly decreased amount of bacterial contamination evidenced in the enzyme solution held at pH 12.0.

EXAMPLE III

A 7.5% by weight solution of crude papain having an initial AMCU of 32 was prepared in accordance with the procedure described in Example I, and was then divided into several aliquot portions. Each aliquot was subjected to a two-step alkaline pH holding process, first being held at pH 12.0 for a first period of time, then being held at pH 8.0 for a second period of time after readjusting the pH with HCl. Also, a sample from each aliquot was subjected to 72 hour incubation at 10° C. after the two-step holding procedure, and was then analyzed for bacterial count.

| Treatment | AMCU | Total Aerobic Count |
|---|---|---|
| 48 hrs. at pH 8.0 | 18 | Not determined |
| 0.25 hrs. at pH 12.0<br>47.75 hrs. at pH 8.0 | 5.9 | 270,000 |
| 2.00 hrs. at pH 12.0<br>46.00 hrs. at pH 8.0 | 2.2 | 27,000 |
| 4.00 hrs. at pH 12.0<br>44.00 hrs. at pH 8.0 | 1.5 | 7,400 |
| 6.00 hrs. at pH 12.0<br>42.00 hrs. at pH 8.0 | 1.1 | 7,600 |
| 8.0 hrs. at pH 12.0<br>40.00 hrs. at pH 8.0 | 1.2 | 7,600 |
| 12.00 hrs. at pH 12.0<br>36.00 hrs. at pH 8.0 | 1.1 | 540 |
| 16.00 hrs. at pH 12.0<br>32.00 hrs. at pH 8.0 | 1.7 | — |
| 20.00 hrs. at pH 12.0<br>28.00 hrs. at pH 8.0 | 2.1 | — |
| 24.00 hrs. at pH 12.0<br>24.00 hrs. at pH 8.0 | 3.2 | — |
| 48 hrs. at pH 12.0 | 5.0 | Not determined |

This example demonstrates the synergistic effect obtained when utilizing a two-step pH treatment procedure to reduce active enzyme content of papain to an AMCU level suitable for ante-mortem injection into animals.

EXAMPLE IV

A 7.5% by weight solution of crude papain was prepared and divided into three portions. The pH was adjusted to pH 11.0, 11.5 or 12.0 and held 6 hours at 10° C. Then each portion was divided into five aliquots and adjusted to pH 8.0, 8.5, 9.0, 9.5 or 10.0. The solutions were held for an additional 18 hours at 10° C. All samples were then adjusted to pH 8.0 immediately before analyses, with the following results.

| Initial pH | Adjusted pH | AMCU | TMCU |
|---|---|---|---|
| 11.0 | 8.0 | 16 | 42 |
|  | 8.5 | 17 | 43 |
|  | 9.0 | 16 | 43 |
|  | 9.5 | 17 | 43 |
|  | 10.0 | 16 | 43 |
| 11.5 | 8.0 | 16 | 44 |
|  | 8.5 | 15 | 44 |
|  | 9.0 | 15 | 44 |
|  | 9.5 | 15 | 44 |
|  | 10.0 | 15 | 44 |
| 12.0 | 8.0 | 6.7 | 39 |
|  | 8.5 | 5.3 | 42 |
|  | 9.0 | 6.1 | 42 |
|  | 9.5 | 3.0 | 42 |
|  | 10.0 | 6.1 | 43 |

This example illustrates that a two-step high pH treatment will significantly lower enzyme activity (AMCU). without appreciably lowering total enzyme activity (TMCX). The example also demonstrates that initial treatment of the enzyme solution at pH 12.0 is substantially more effective than initial treatment at pH 11.0 or 11.5.

EXAMPLE V

A 10% by weight solution of crude papain was prepared. pH was adjusted to 12.0 and held for 24 hours. The pH was then lowered to 8.0 and 1 gram thiamine disulfide was added per 25 grams of enzyme powder in solution. The solution was held for an additional 24 hours, and then analyzed for enzyme activity. Total milk clot units (TMCU) measured 51 and available milk clot units (AMCU) measured 2.0.

Solutions prepared in accordance with the high pH treatments of the above examples were injected into old ewes with no animal reaction, and cuts of meat obtained therefrom exhibited increased tenderness.

Obviously many modifications and variations of the invention as hereinbefore set forth may be made without departing from the spirit and scope thereof, and, therefore, only such limitations should be imposed as are indicated in the appended claims.

We claim:
1. A process for preparing a proteolytic enzyme solution suitable for ante-mortem intravascular injection into animals, comprising: forming an aqueous solution of a food grade or crude plant-derived protease selected from the group consisting of papain, ficin and a mixture thereof; adjusting the pH of said solution to from 11.0 to 12.5; and holding said solution at said pH for a period of time of greater than 4 hours.
2. The process of claim 1 wherein the enzyme solution is subsequently injected into live cattle.
3. The process of claim 1 wherein the protease is papain and wherein the solution is held at a pH of about 12.0.
4. The process of claim 1 wherein the protease is papain and wherein the solution is held at a pH of about 12.0 for from 4–72 hours at a temperature of from about 0°–20° C.
5. The process of claim 3 wherein the high pH treated solution is subsequently reacted with a disulfide inactivator.
6. A process for preparing a proteolytic enzyme solution suitable for ante-mortem injection into animals, comprising: forming an aqueous solution of a food grade or crude plant-derived protease selected from the group consisting of papain, ficin and a mixture thereof; adjusting the pH of said solution to from 11.0 to 12.5, and holding for from ¼ to 24 hours; then re-adjusting the pH of said solution to from 7.0 to 10.5, and holding for greater than 2 hours.
7. The process of claim 6 wherein the enzyme solution is subsequently injected into live cattle.
8. The process of claim 6 wherein the protease is papain, and wherein the solution is first held at a pH of about 12.0 for from 4–20 hours, and is subsequently held at a pH of about 8.0 for from 2–48 hours.

* * * * *

UNITED STATES PATENT OFFICE
CERTIFICATE OF CORRECTION

PATENT NO. : 4,024,285
DATED : May 17, 1977
INVENTOR(S) : JACK F. BEUK, WILLIAM D. WARNER and CHUNGHEE K. KANG It is certified that error appears in the above-identified patent and that said Letters Patent are hereby corrected as shown below:

The patent should show on its face that it is assigned to Swift & Company of Chicago, Illinois.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*